United States Patent
Panagiotou

[19]

[11] Patent Number: 6,102,725

[45] Date of Patent: *Aug. 15, 2000

[54] REPLACEABLE BATTERY HOUSING ELECTRICAL CONNECTOR ASSEMBLY

[76] Inventor: George N. Panagiotou, 412 Calle San Pablo, Unit #200, Camarillo, Calif. 93010

[ * ] Notice: This patent issued on a continued prosecution application filed under 37 CFR 1.53(d), and is subject to the twenty year patent term provisions of 35 U.S.C. 154(a)(2).

[21] Appl. No.: 09/150,995

[22] Filed: Sep. 10, 1998

[51] Int. Cl.[7] .................................................. H01R 13/625
[52] U.S. Cl. ........................................... 439/342; 439/265
[58] Field of Search ..................................... 439/342, 343, 439/929, 593, 783, 836, 861, 862, 832, 834, 837, 350, 265, 259, 261, 263, 266, 268, 262, 264.1, 264.2, 346, 820, 188; 200/51.09, 51.16, 533, 534, 535, 530, 531, 532; 361/625

[56] References Cited

U.S. PATENT DOCUMENTS

| | | | |
|---|---|---|---|
| 931,202 | 8/1909 | Holland | 379/194 |
| 1,011,758 | 12/1911 | Dean | 200/530 |
| 4,218,107 | 8/1980 | Wilson | 339/75 |
| 4,550,968 | 11/1985 | Corrigan | 339/91 |
| 4,810,204 | 3/1989 | Wilson | 439/343 |
| 4,822,296 | 4/1989 | Wilson | 439/343 |
| 5,374,199 | 12/1994 | Chung | 439/188 |
| 5,412,547 | 5/1995 | Hornblad et al. | 362/183 |
| 5,822,546 | 10/1998 | George | 395/281 |

*Primary Examiner*—Paula Bradley
*Assistant Examiner*—Ross Gushi
*Attorney, Agent, or Firm*—Kenneth J. Hovet

[57] ABSTRACT

A battery housing electrical connector assembly that utilizes a pair of plates with these plates to be lockingly connected together in an interlocked position. The locking together is achieved through the use of a pair of plug type electrical connectors each of which matingly connects with an opening. A connecting arrangement between the two plates is achieved by one plate being moved in a lineal direction with the other plate. There being at least one auxiliary electrical connector in the form of a protruding pin connected between the first plate and the second plate. The plate that does not have the protruding pin has an electrical contact which is to be moved transversely to the lineal direction to be either in contact with the protruding pin to achieve an electrical connection or to be spaced from the protruding pin not achieving an electrical connection. The battery housing is to also include an illuminatable display panel upon which is to be imprinted informative indicia.

15 Claims, 5 Drawing Sheets

REPLACEABLE BATTERY HOUSING ELECTRICAL CONNECTOR ASSEMBLY

BACKGROUND OF THE INVENTION

1) Field of the Invention

The subject matter of this invention is directed to an electrical connector assembly for a battery housing in conjunction with an electrically operated appliance or a separate charger.

2) Description of the Prior Art

The present invention has particular utility when utilized in conjunction with an appliance such as a portable television camera. However, it is to be considered to be within the scope of this invention that the electrical connector assembly could be utilized in conjunction with appliances other than cameras.

A portable television camera requires a power source for operation. This power source is in the form of a battery contained within a battery housing. The battery housing is designed to quickly snap into engagement with the camera and also be able to quickly snap out of engagement with the camera so that the battery housing can then be replaced with a new battery or be mounted in conjunction with a battery charger for the purpose of recharging the battery.

Similar types of electrical connector assemblies are shown within U.S. Pat. Nos. 4,218,107, 4,550,968 4,810,204 and 4,822,296. These prior art battery housing electrical connector assemblies all utilize a plate mounted on the battery housing which is to connect with a plate mounted on the camera with a similar such plate mounted on the battery charger. In establishing a locking connection between the two plates, there is utilized a connecting arrangement of a plurality of enlarged headed fasteners mounted on one plate each of which are to engage with a separate keyhole slot formed in the opposite plate. This interlocking enlarged headed fastener and keyhole slot arrangement lockingly connects together the two plates. The locking together of the two plates is accomplished by means of a pair of main electrical terminals in the form of a pair of plugs each of which is to be snugly located within a corresponding opening formed in the opposite plate. These main electrical connectors are for the purpose of supplying the electrical power from the battery to the appliance or the electrical power from the battery charger to the battery.

Incorporated between the plates are usually two in number of auxiliary circuits. One of these auxiliary circuits is to operate a shut-off device which terminates or prohibits battery charging when the ambient temperature is too low. The other auxiliary circuit is to operate a temperature indicator which becomes operable during the charging procedure. If the temperature during charging exceeds a certain level, it can be exceedingly damaging to the structure of the battery. Therefore, the temperature indicator is most important so that the life of the battery is not lost. These batteries are relative expensive and it is therefore desirable to obtain the maximum longevity from the battery.

These auxiliary connectors usually comprise-protuberances in the form of spring operated plungers. The normal connecting procedure with these spring operated plungers is for an electrical connection to be established at the head or tip of the plunger with the electrical connector applying pressure to the plunger in a direction parallel to the longitudinal dimension of the plunger. However, this type of electrical connection is not exceedingly positive and there is a possibility that a poor electrical connection is achieved which will result in a misreading of the temperature indicator or cause the shut-off device to misoperate.

The portable television cameras, which are to be powered by the battery housing of the established electrical connector assembly of this invention, are used by television stations remote from the television station. These types of cameras are readily used "on the street" where access to wired electrical power is not available. Quite commonly, there may be three, four or more television crews of different stations that are filming the particular occurrence. The camera from one television station is commonly located behind the camera of another television station. If the battery housing could be modified to include a display panel, and within that display panel be located indicia such as the television channel and/or the TV station of the user, that information would be filmed by a second TV camera located to the rear of the first camera. In other words, the television station of the first camera could be, in essence, getting some advertising by the second camera by the including of the display panel. To further enhance the observability of the display panel, the display panel could be illuminated.

SUMMARY OF THE INVENTION

One of the primary objectives of the present invention is to construct a battery housing electrical connector assembly that produces an exceedingly positive electrical connection with both the battery indicator terminal and the temperature indicator terminal so as to eliminate incorrect or nonreadings of the battery indicator and the temperature indicator.

Mounted on the battery housing is a plate with this plate to lockingly connect with a separate plate that is mounted on the appliance or on a battery charger. When the plates are locked together on the appliance, there are a pair of main contact terminals each of which fits tightly within an opening and establishes the main circuit which, in the case of the appliance, is the supplying of power to the appliance, and in the case of the charger provides for electrical charging current to be supplied to the battery. At the same time, there are a pair of auxiliary contacts which are engaged, one being a battery indicator circuit and the second being a temperature indicator circuit. The battery indicator circuit is used when the battery housing is connected to the appliance, and the temperature indicator circuit is used when the battery housing is connected to the charger. One of the plates includes a pair of laterally movable electrical contacts. These contacts are to moved laterally with one contact being forcibly moved into engagement with the battery indicator terminal and the other contact being forcibly moved into engagement with the temperature indicator terminal. The battery housing includes a display panel with this display panel to include personal indicia that is selected by the user. This indicia is to be observable from the rear of the appliance. This display panel is to be selectively illuminated by means of an on/off switch in order to light up the indicia and make such more readily observable by someone located rearwardly of the appliance.

DETAILED DESCRIPTION OF THE PREFERRED EMBODIMENT

Figure 1:
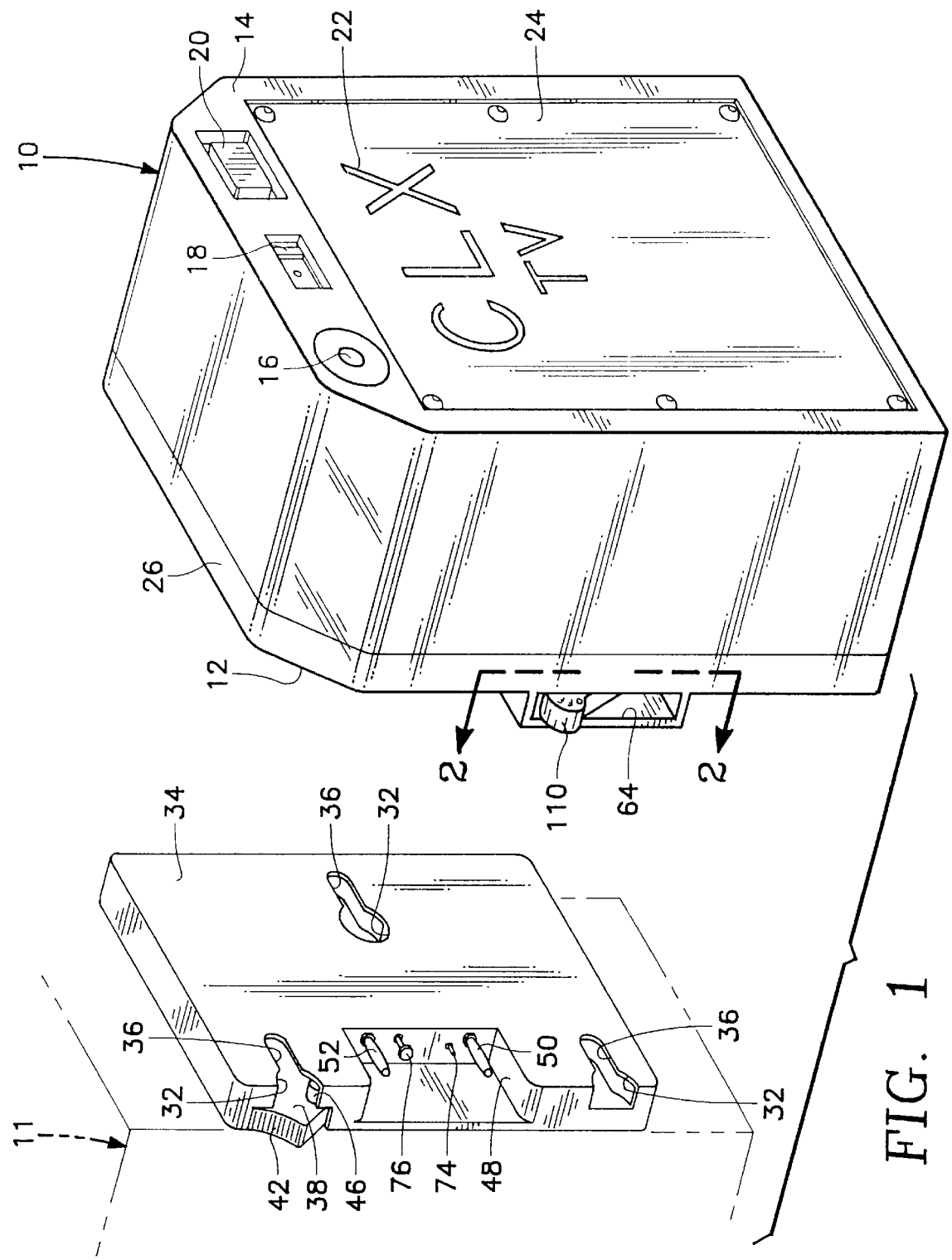
FIG. 1 is an isometric view of a battery housing of the present invention which is to be connected to a connector plate which is to be mounted on an appliance or on a battery charger.
Figure 2:
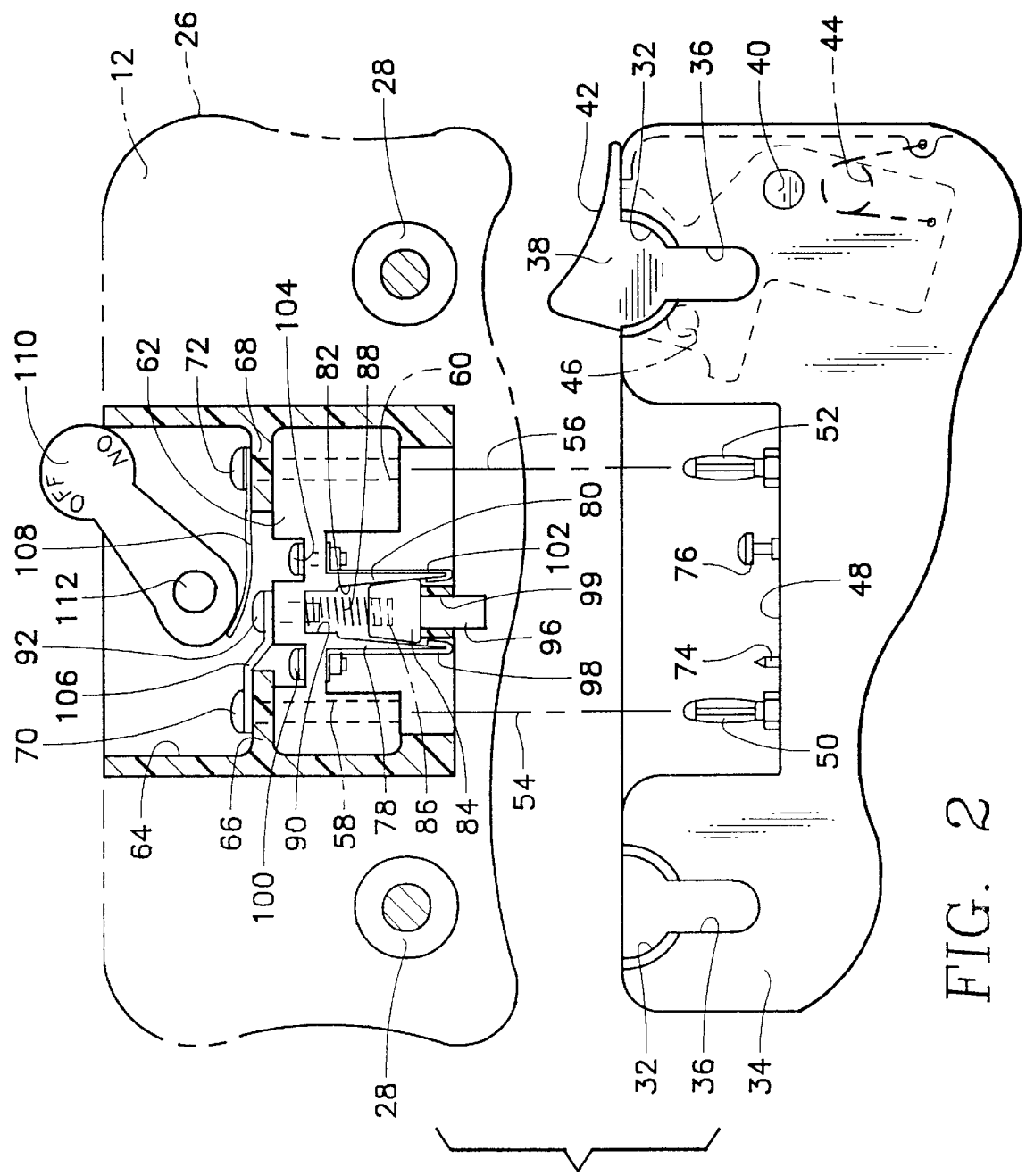
FIG. 2 is an exploded view of a portion of the male electrical connector plate which is mounted on the front surface of either a battery charger or appliance taken along line 2—2 of FIG. 1 depicting its interlocking connection arrangement with a portion of a female electrical connector plate which is mounted on the battery housing.

Referring particularly to FIG. 1 there is shown the battery housing 10 which has a front surface 12 and a rear surface 14. The shape of the battery housing 10 is basically rectangular with the rear surface 14 being located parallel to the front surface 12. However, any desired shape could be utilized. Included within the battery housing 10 is a battery, which is not shown. The rear surface 14 includes a conventional reset switch 16 and a manually operated slide switch 18. The reset switch 16 is to be used to reestablish the charging circuit if there is a surge in power which causes the reset switch 16 to be moved to the open position. Pushing of the reset switch 16 will again move the reset switch 16 to the closed position. The slide switch 18 is to be manually operated to either occupy a "green" position which indicates to the user that the battery is fully charged, or can occupy a "red" position which indicates that the battery needs charging. When the push button 20 is depressed, the indicia 22 is illuminated upon the display panel 24. The display panel 24 is to be individually inscribed with the particular user's form of indicia 22. Typically, the display panel 24 will include the name of a particular TV station, possibly a channel, maybe the name of the camera operator and/or possibly the trade name of the battery housing 10. The display panel 24 could be separate from the battery housing 10 and mounted on the camera itself. The battery housing 10 includes a female electrical connector plate 26. The female plate 26 is part of the battery housing 10. Actually, the front surface 12 is defined as the outer surface of the female plate 26.

The female plate 26 includes a plurality of enlarged headed fasteners 28. Each of the enlarged headed fasteners 28 includes a narrow center shaft 30. There are to be three in number of the fasteners 28. However, there are only two in number of the fasteners 28 shown in the drawings. Each fastener 28 is to connect with a keyhole slot 32 formed within a male plate 34. There are three in number of the keyhole slots 32 located in a spaced-apart pattern. Each keyhole slot 32 includes a narrowed, lower section 36. The center shaft 30 of each fastener 28 is to be located within the lower section 36 with the female plate 26 mounted in conjunction with the male electrical connector plate 34. The enlarged head of the fastener 28 is to be inserted through the enlarged portion of the keyhole slot 32 and then as the shaft 30 is moved into the lower section 36, a snug interconnection is achieved between the fasteners 28 and their respective keyhole slots 32. This snug interconnection secures together the female plate 26 and the male plate 34. However, to ensure that the female plate 26 always maintains engagement with the male plate 34 when such is desired, there is included a positive lock in the form of a lever 38 which is mounted in conjunction with one of the keyhole slots 32. The lever 38 is pivotly mounted to the male plate 34 by means of a pivot pin 40. The lever 38 is movable a limited distance by the application of manual force against serrated surface 42 which will pivot the lever from a locking position to an unlocking position against the bias of a spring 44. One leg of the spring 44 is attached to the male plate 34, and the opposite leg of the spring 44 is attached to the lever 38. The lever 38 has mounted thereon a locking pin 46. During inserting of the male plate 34 in conjunction with the female plate 26, the enlarged headed fastener 28 will cam against the locking pin 46 causing the lever 38 to pivot to the unlocking position. Once the enlarged headed fastener 28 has moved by the locking pin 46, the bias of the spring 44 will cause the lever 38 to be pivoted to the locking position which will position the locking pin 46 against the enlarged headed fastener 28 which tends to maintain the enlarged headed fastener 28 in its established position in conjunction with its keyhole slot 32. If one of the enlarged headed fasteners 28 is maintained in position in conjunction with its keyhole slot 32, it is understood that the other enlarged headed fasteners 28 will also be so maintained. Therefore, there is only a need for one single locking device in the form of one lever 38. Manual application of pressure against serrated surface 42 pivoting of lever 38 to disengage the locking pin 46 from the enlarged headed fastener 28 is required prior to disengaging movement of the male plate 34 from the female plate 26.

The male plate 34 includes a recessed area 48. Within recessed area 48 there are mounted a spaced-apart male plug electrical terminals 50 and 52. These electrical terminals 50 and 52 are identical and are located in a spaced-apart manner. Male plug 50 has its longitudinal dimension aligning with longitudinal axis 54. The male plug 52 has its longitudinal dimension aligning with longitudinal axis 56. The interconnection of the female plate 26 with the male plate 34 requires that the male plug electrical terminals 50 and 52 to be moved in a lineal direction in alignment with the longitudinal axes 54 and 56. This movement is such that will cause the male plug electrical terminal 50 to be mounted within opening 58 with the male plug electrical terminal 52 being mounted within opening 60. Openings 58 and 60 are mounted within a mounting block 62 which is mounted within a recess area 64 of the female plate 26.

The opening 58 is located directly against a mounting flange 66 of the female plate 26. Similarly, the opening 60 is located directly against a mounting flange 68 of the female plate 26. Mounted through a hole formed within the mounting flange 66 is an enlarged headed fastener 70. A similar enlarged headed fastener 72 is mounted in conjunction with the mounting flange 68. The enlarged headed fastener 70 extends within the opening 58, and the enlarged headed fastener 72 extends within the opening 60. When the male plug electrical terminals 50 and 52 are fully inserted within their respective openings 58 and 60, the male plug electrical terminal 50 will establish physical contact with the enlarged headed fastener 70. The same physical contact will occur between the male plug electrical terminal 52 and the enlarged headed fastener 72. It is to be understood that appropriate electrical wires are to be connected to the male plug electrical terminals 50 and 52, which are not shown, with these wires to provide a main power supply circuit which is to be supplied through the main terminals which are composed of the male plug electrical terminals 50 and 52. This main power supply through the terminals 50 and 52 is to comprise either the charging electrical power being supplied to the battery contained within the battery housing 10 or the supply of power from the battery to the electrical appliance.

Also mounted in conjunction with the recessed area 48 located between the male plug electrical terminals 50 and 52 are a pair of auxiliary terminals 74 and 76. These terminals 74 and 76 are shown to be of a different exterior configurations. However, these terminals 74 and 76 could be of the same configuration if such is desired. The terminal 74 is to electrically connect to a shut-off device (not shown) which terminates or prohibits battery charging when the ambient temperature is below forty-one degrees fahrenheit. The auxiliary terminal 76 is to be connected to a temperature indicator circuit which includes an appropriate temperature indicator, which is again not shown, which will be activated when the battery contained within the battery housing 10 is being charged and is not connected to the appliance.

The mounting block 62 includes a pair of spaced-apart depending legs 78 and 80. In between the depending legs 78 and 80 there is located a wedge space 82. Mounted within the wedge space 82 is a wedge block 84. The wedge block 84 is always snugly mounted within the wedge space 82. It is to be noted that the wedge block 84 is slightly tapered with it being widest at the bottom and narrowest at the top. It is also to be noted that the wedge space 82 is tapered in a correspondingly similar manner. The upper surface of the wedge block 84 includes a recess 86. Mounted within the recess 86 is one end of a coil spring 88. The opposite end of the coil spring 88 passes through gap 90 and connects with enlarged headed fastener 92. Gap 90 does not vary in size. The upper end of the coil spring 88 will extend around the lowermost protruding portion of the enlarged headed fastener 92 which will function as a retainer for the upper end of the coil spring 88. The enlarged headed fastener 92 extends through a hole 94 formed within the mounting block 62.

Integrally connected to the lower end of the wedge block 84 is a push rod 96. This push rod 96 extends through a hole 99 formed within a portion of the female plate 26. The push rod 96 protrudes due to the bias of the coil spring 88 exteriorly of the recess area 64.

Mounted on the depending leg 78 is an electrical contact terminal plate 98. This electrical contact terminal plate 98 is fixedly mounted to the mounting block 62 by means of bolt fastener 100. Covering the depending leg 80 is an electrical contact terminal plate 102 which is also mounted to the mounting block 62 by means of bolt fastener 104. Fixedly mounted between the enlarged headed fasteners 70 and 92 is an electrical conducting strip 106. A flexible electrically conductive strip 108 is cantileverly supported by the enlarged headed fastener 72. The opposite end of the flexible electrically conductive strip 108 is located directly adjacent the enlarged headed fastener 92. This portion of the flexible electrically conductive strip 108 is capable of being moved by the enlarged off-center protrusion formed in the lower end of a switch lever 110. This switch lever 110 is pivotly mounted by means of a pivot pin 112 on the female plate 26. Inscribed on the switch lever 110 is indicia in the form of an "on" and an "off". If there is only one auxiliary terminal similar to terminals 74 and 76, another form of device could be used to move an electrical contact terminal plate in contact with the auxiliary terminals eliminating the need for the wedge block 84.

Figure 3:
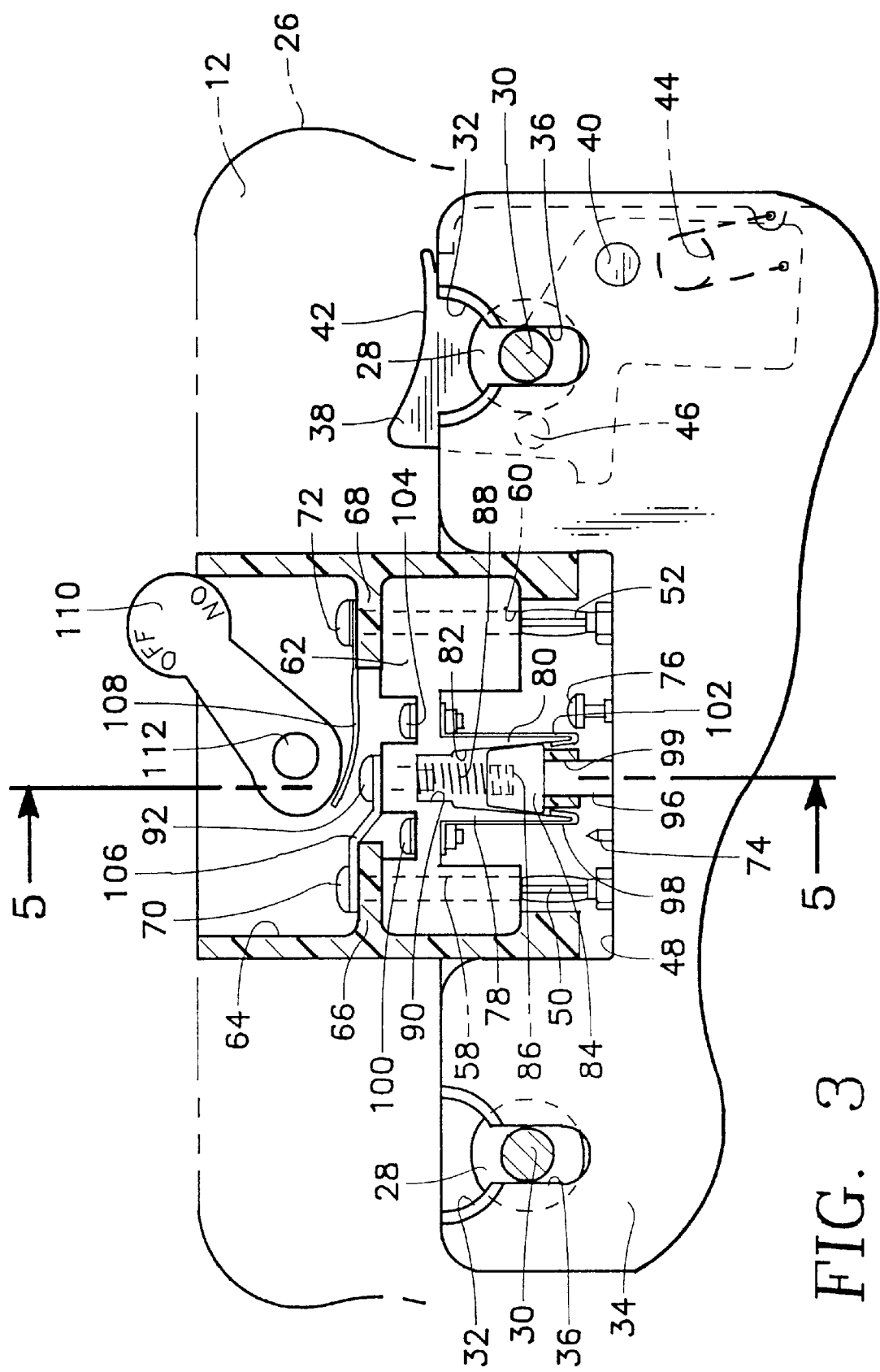
FIG. 3 is a view similar to FIG. 2 showing the male plate at an intermediate, interlocking stage with the female plate.
Figure 4:
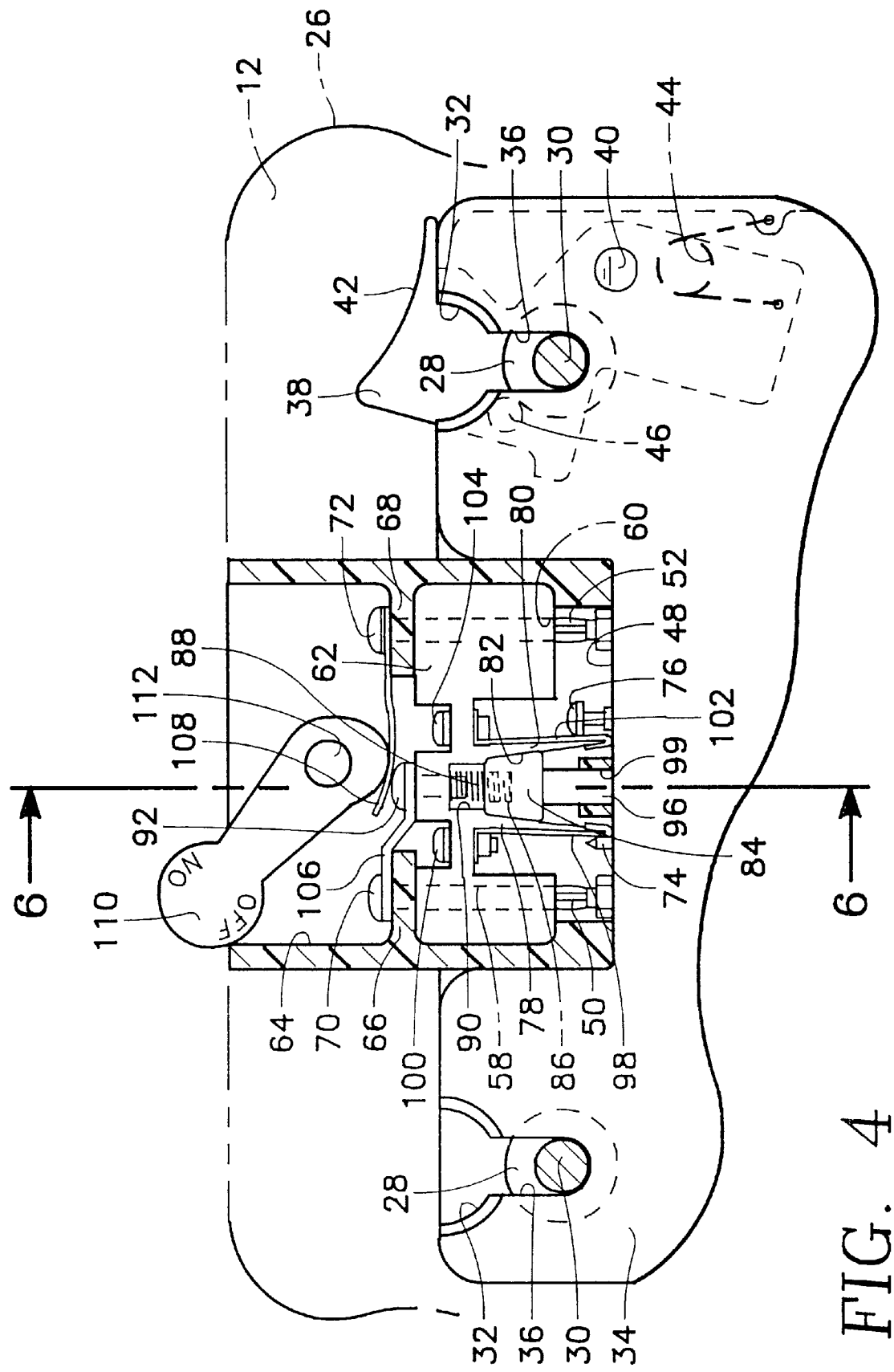
FIG. 4 is a view similar to FIG. 3 but showing the male plate fully interlocked with the female plate.
Figure 6:
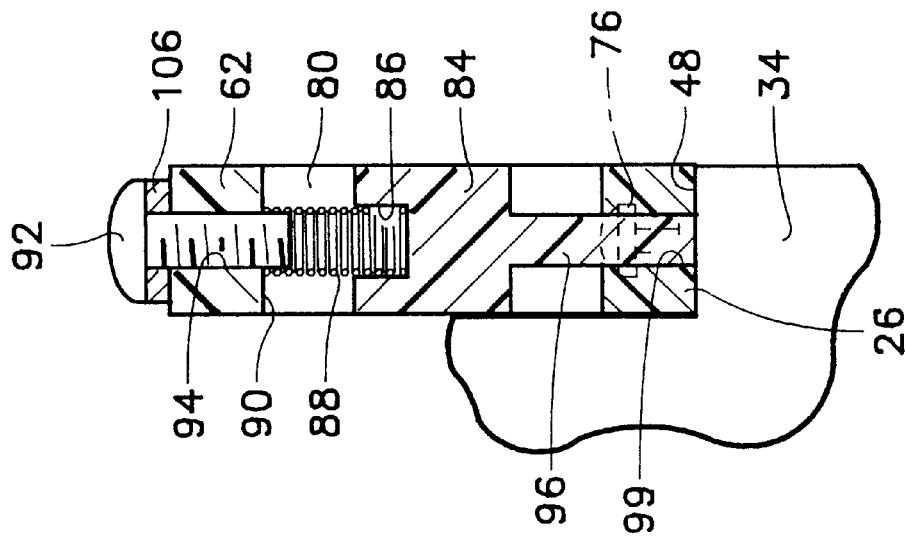
FIG. 6 is a cross-sectional view taken along line 6—6 of FIG. 4.
Figure 5:
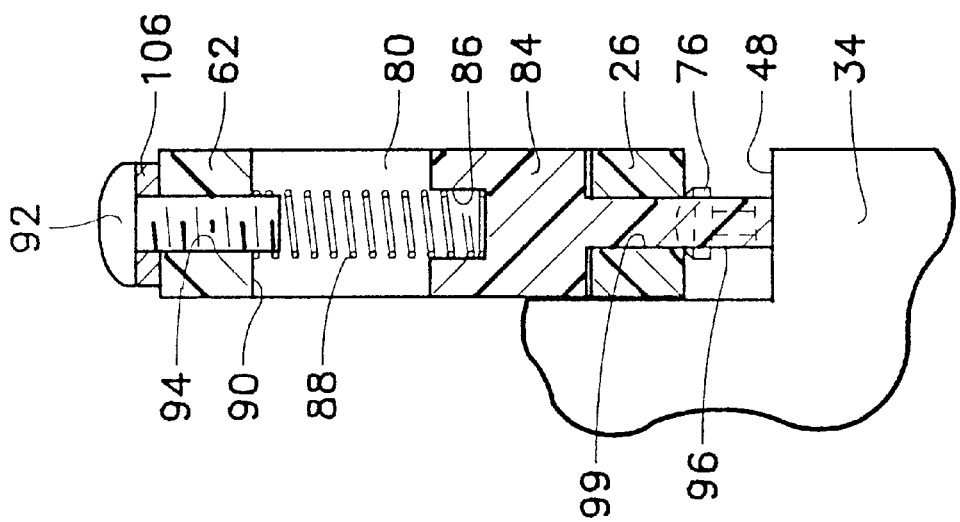
FIG. 5 is a cross-sectional view taken along line 5—5 of FIG. 3.

The switch lever 110 is capable of being pivoted from the "off" position shown in FIG. 3 to the "on" position shown in FIG. 4. When in the "off" position, the word off is readily observable from the portion of the switch lever 110 that protrudes exteriorly of the recess area 64. In this particular position, the flexible electrically conductive strip 108 is located spaced from the enlarged headed fastener 92. However, when the switch lever 110 is pivoted counterclockwise approximately ninety degrees from the position shown in FIG. 3, the flexible electrically conductive strip 108 is caused to be pushed into contact with the enlarged headed fastener 92. Also, the word "on" will be clearly observable with the word "off" now being essentially hidden from view. When the switch lever 110 is moved to the "on" position, as shown in FIG. 4, only then can power be supplied from the battery to the appliance or power supplied from the charger to the battery. Manual activation of the switch lever 110 is required prior to the conducting of electrical energy to and from the battery.

The operation of the replaceable battery housing electrical connector assembly of this invention is as follows: Let it be assumed that the battery housing 10 is to be connected to the male plate 34. The enlarged headed fasteners 28 are connected with the keyhole slots 32 and then the female plate 26, along with the entire battery housing 10, is moved in the lineal direction along the longitudinal axes 54 and 56 until the male plug electrical terminal 50 engages with the opening 58 and the male plug electrical terminal 56 engages with the opening 60. Further engaging movement of the terminals 50 and 52 with their respective openings 58 and 60 will result in the bottom wall of the recessed area 48 coming into contact with the push rod 96. Further inward direction movement along the longitudinal axes 54 and 56 will cause the push rod 96 to be moved in an inward direction which forces the wedge block 86 to the upper area of the wedge space 82 compressing the spring 88 and causing the depending legs 78 and 80 to spread outwardly. The spreading of the depending legs 78 and 80 will result in the electrical contact terminal plate 98 being pressed tightly against auxiliary terminal 74 and the electrical contact terminal plate 102 pressing tightly against auxiliary terminal 76. At this particular time, lever 38 assumes a locking position with the locking pin 46 abutting against the enlarged headed fastener 28 tending to hold such in the locking position. Now, in order to activate either the charging circuit or the supplying of electrical energy to the appliance, it is necessary to move the switch lever 110 from the "off" position shown in FIG. 3 to the "on" position shown in FIG. 4 which will cause the flexible electrical conducting strip 108 to be moved into contact with the enlarged headed fastener 92. Also electrical contact is achieved with the auxiliary circuits which include the auxiliary terminals 74 and 76. The male plate 34 is shown mounted on an appliance 11, such as a camera, in FIG. 1 or a charging unit 11.

What is claimed is:

1. A replaceable battery housing electrical connector assembly comprising:

a first plate having a mounting block;

a second plate, said second plate to removably, lockingly connect with said first plate in an interlocked position, said second plate to lockingly connect with said first plate by being moved in a lineal direction, said second plate having at least one auxiliary electrical terminal in the form of a protruding pin; two cantilevered depending legs which are spaced-apart to define a wedge space, said legs extending from said mounting block with each leg having an adjacent electrical contact means; a wedge block assembly reciprocally connected to said mounting block, said wedge block assembly including a wedge block located within said wedge space and being movable relative to said first plate in said wedge space, said wedge block assembly to cause lateral movement of said depending legs causing said electrical contact means to move from a spaced position from said auxiliary electrical terminal to a contact position in contact with said auxiliary electrical terminal, whereby an auxiliary electrical circuit is established with said electrical contact means in physical contact with said auxiliary terminal.

2. The replaceable battery housing electrical connector assembly as defined in claim 1 wherein:

said wedge block assembly being movable relative to said first plate in a direction parallel to said lineal direction.

3. The replaceable battery housing electrical connector assembly as defined in claim 1 wherein:

said first plate comprising a female electrical connector and said second plate comprising a male electrical connector.

4. The replaceable battery housing electrical connector assembly as defined in claim 1 wherein:

said second plate including a pair of male plug electrical terminals, said male plug electrical terminals to connect with said first plate when said first plate and said second plate achieve said interlocked position.

5. The replaceable battery housing electrical connector assembly as defined in claim 4 wherein:

an on/off switch mounted on said first plate, said on/off switch electrically connecting with said male electrical plug terminals, with said on/off switch in an "off" position no electrical power is transmitted from a battery through said male plug electrical terminals, with said on/off switch in an "on" position electric power is to be conducted through a battery through said male plug electrical terminals.

6. The replaceable battery housing electrical connector assembly as defined in claim 1 wherein:

there being a pair of said auxiliary electrical terminals in the form of a pair of spaced apart protruding pins.

7. The replaceable battery housing electrical connector assembly as defined in claim 6 wherein:

said wedge block assembly being located between said protruding pins when said first plate and said second plates are in said interlocked position.

8. The replaceable battery housing electrical connector assembly as defined in claim 7 wherein:

said wedge block assembly being movable by an actuator, said actuator to be contacted by said second plate during the interconnecting movement of said first plate and said second plate in said interlocked position.

9. The replaceable battery housing electrical connector assembly as defined in claim 7 wherein:

said electrical contact means comprising at least two separate electrical contacts, each of said contacts being attached to a respective depending leg to connect with a respective protruding pin.

10. The assembly as defined in claim 1 further comprising:

said battery housing having a front surface and a rear surface, said front surface being adapted to attach to said first plate, said rear surface being spaced from said front surface and being readily observable from a position spaced rearwardly from said assembly; and, a display panel upon which is imprinted informative indicia, said display panel being mounted on said rear surface of said housing.

11. The assembly as defined in claim 10 wherein:

said display panel including illumination means for improving the visibility of indicia on said panel.

12. The assembly as defined in claim 11 wherein:

said battery housing including an on-off switch, said on/off switch being locatable in either an "on" position or an "off" position, with said on/off switch in said "on" position said display panel being illuminated, with said on/off switch in said "off" position said display panel not being illuminated.

13. A battery housing electrical connector comprising:

a first plate having a mounting block from which extend two flexible cantilevered depending legs which are spaced-apart to define a wedge space, each one of said legs including a respective electrical contact means;

a wedge block slidably connected to said mounting block, said wedge block being located within said wedge space and being movable in a lineal direction into said wedge space against said legs to cause said legs and respective electrical contact means to flex outwardly; and, a second plate to removably, lockingly connect with said first plate by being moved in said lineal direction, said second plate having at least one auxiliary electrical terminal for establishing an auxiliary circuit with said electrical contact means when said wedge block moves into said wedge space and causes said electrical contact means to engage said auxiliary electrical terminal.

14. A connector as recited in claim 13 wherein said auxiliary electrical terminal is a pin protruding from said second plate.

15. A connector as recited in claim 13 wherein said electrical contact means comprises at least one contact terminal plate attached to a respective depending leg.

* * * * *